No. 789,824.

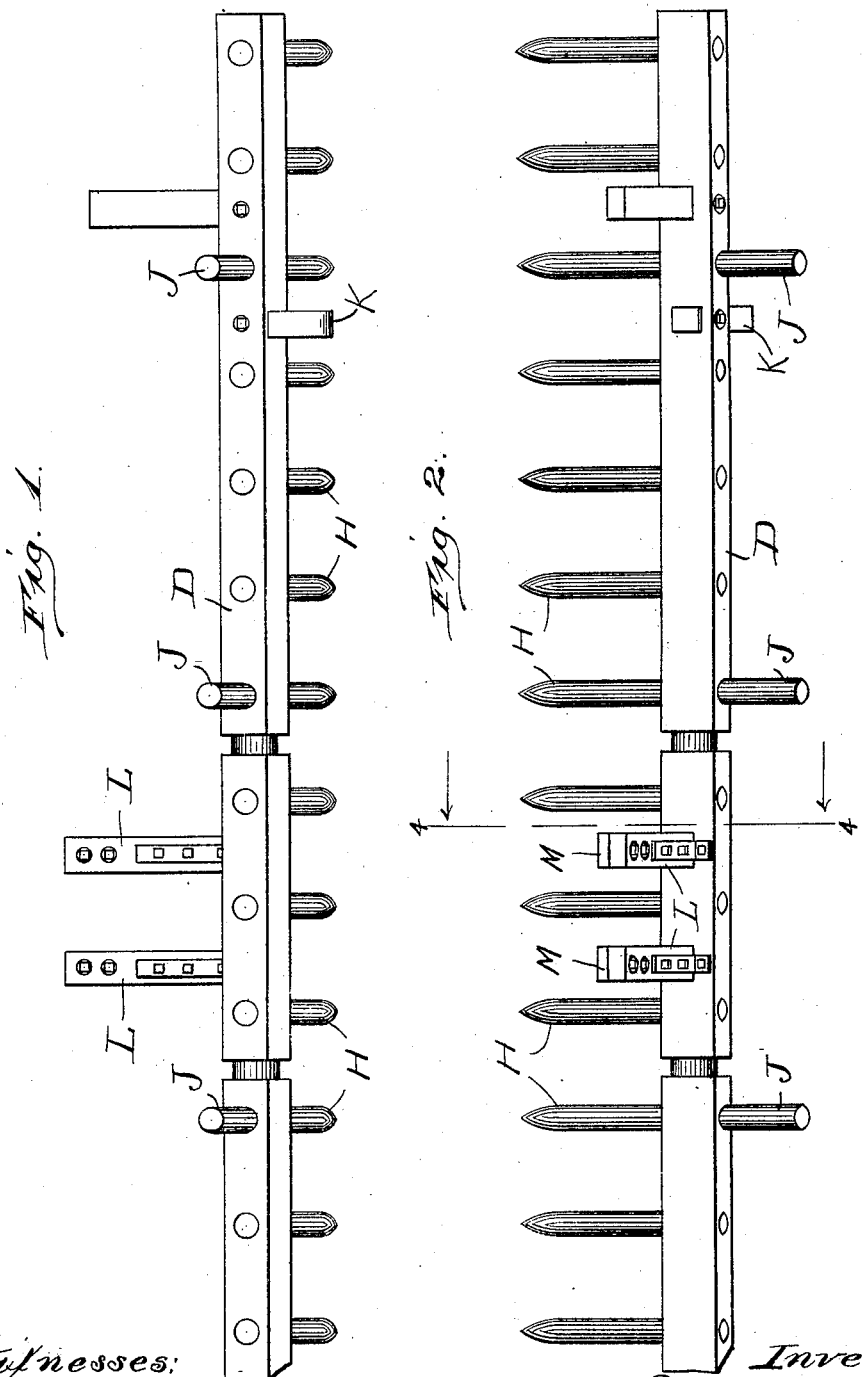

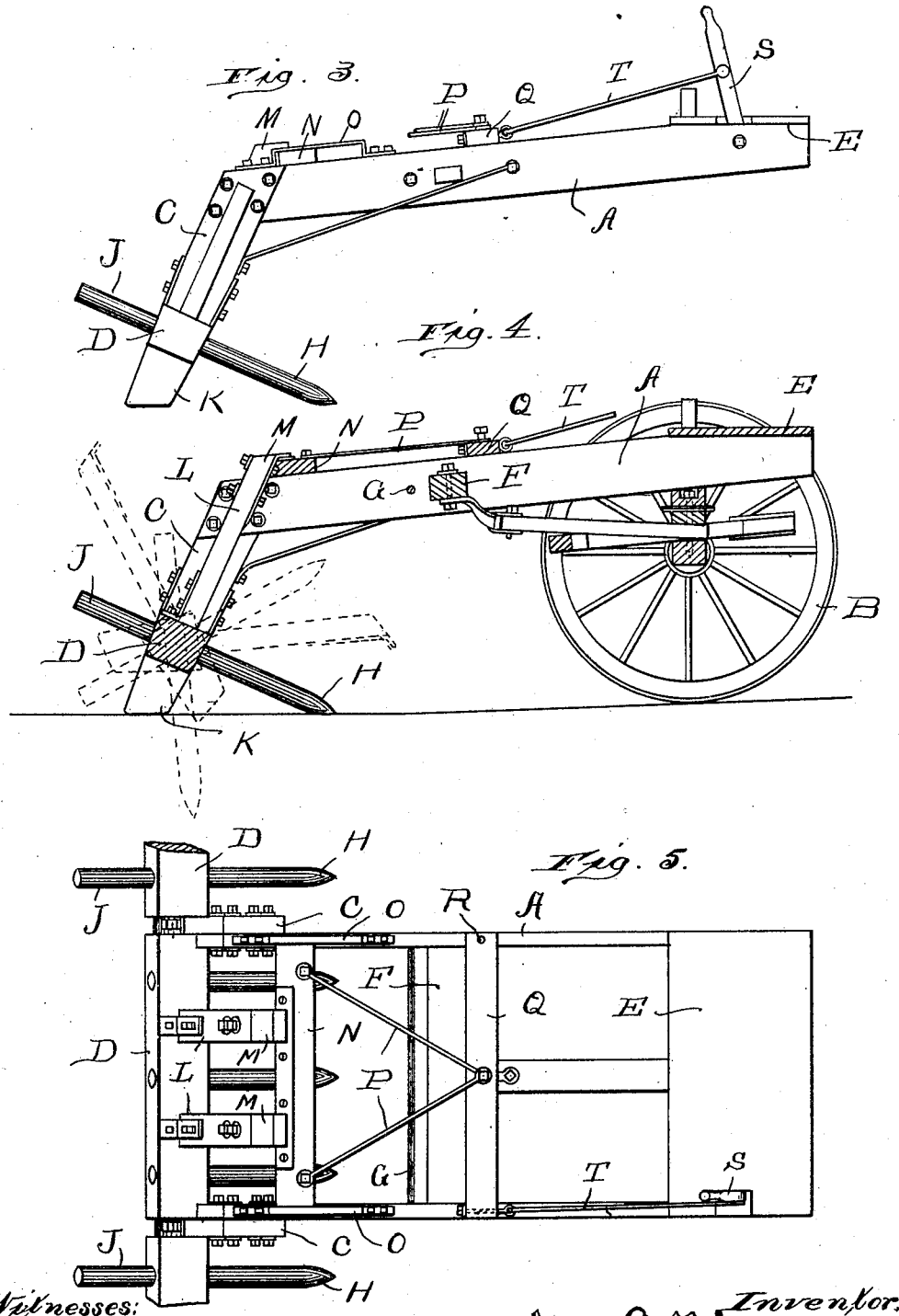

Patented May 16, 1905.

UNITED STATES PATENT OFFICE.

ASLER C. THOMPSON, OF ALLERTON, ILLINOIS.

STALK-RAKE.

SPECIFICATION forming part of Letters Patent No. 789,824, dated May 16, 1905.

Application filed March 7, 1904. Serial No. 196,941.

*To all whom it may concern:*

Be it known that I, ASLER C. THOMPSON, a citizen of the United States, residing at Allerton, in the county of Vermilion and State of Illinois, have invented certain new and useful Improvements in Stalk-Rakes; and I do hereby declare the following to be a full, clear, and exact description of the invention, such as will enable others skilled in the art to which it appertains to make and use the same.

My invention relates to a novel construction in a stalk-rake, the object being to provide a device of this description which is very simple in construction, efficient, and easily operated; and it consists in the features of construction and combinations of parts hereinafter fully described and claimed.

In the accompanying drawings, illustrating my invention, Figure 1 is a detail rear elevation of the revoluble rake member. Fig. 2 is a top plan view of same. Fig. 3 is a side elevation of the rake and the frame carrying same, the wheels being removed. Fig. 4 is a vertical longitudinal section of same. Fig. 5 is a top plan view.

The main object of my invention is to provide a stalk-rake which will gather the stalks in bundles and when a sufficient number of such stalks have been gathered can be readily operated to ride over, and thus deposit such bundle without danger of again spreading same.

As illustrated in the accompanying drawings, my device is shown as constructed mainly of wood, this having been found most convenient; but I desire it to be understood that any suitable material may be used in its construction and the shapes and sizes of various parts altered in accordance with such material without departing from the spirit of my invention.

Referring now to said drawings, A indicates a horizontal frame suitably supported at its forward end upon a truck B and provided at its rear end with two downwardly-extending tailpieces C, which carry the revoluble bar D of the rake. The said frame A comprises two parallel beams, connected at their forward ends by a cross-piece E, which may form a seat for the operator, if desired, and are further connected together by a cross-beam F and rod G between their ends. The said bar D of the rake is journaled in bearings in the free ends of said tailpieces C and is provided with parallel teeth H at regular intervals, the majority of said teeth terminating at their rear ends flush with the rear face of said bar D and the remainder projecting rearwardly thereform, as at J. Said bar D is normally supported a given distance above the earth by means of shoes K, mounted thereon and having beveled lower ends which slide on the earth, said bar being normally held in a position to hold said teeth in an inclined position, with their points resting upon the earth, by means of arms L, rigidly mounted on said bar D and provided at their free ends with projections M, adapted to engage a stop N, movably mounted on the frame A. The said stop N consists of a bar extending across the frame A and moving in the guides O thereon. Said bar N is connected, by means of rods P, with the middle portion of a lever Q, pivoted at one end R to said frame and connected at its free end with a lever S by means of the link T, said lever S being pivotally mounted upon the forward end of said frame at a point convenient for its operation by the driver.

The operation of my device is as follows: When the teeth of the rake have gathered up a sufficient number of stalks to form a bundle, the lever S is moved forward, thereby obviously withdrawing said stop N from the path of the projections M of the arms L. The points of the teeth thereupon immediately engage the earth, and thereby impart pivotal motion to the bar D, raising same until said teeth reach a vertical position, when the stalks gathered on said teeth fall to the ground. The rotation of said bar D continues until said projections M strike the ground and by digging into same form fulcrums upon which said arms L turn, thereby further turning the bar D. Next the projecting rear ends J of the teeth H and then the sharp rear corners of the shoes K strike the ground and serve to continue the rotation of said bar D until the same has completed a revolution and the projections M again engage said stop or bar N, the latter being only momentarily moved forward to release said arms L and being then immediately returned into the path of the latter.

The various parts of my device are suitably connected and braced to impart the necessary strength thereto.

It will be noted that as the bar D turns the rake will ride completely over the bundle deposited thereby and resume its operation some distance beyond such bundle.

I claim as my invention—

1. In a stalk-rake, the combination with a frame, of a rake revolubly mounted thereon, and comprising a bar provided with teeth projecting from one side only, shoes adapted to support said bar above the earth, rearwardly-extending projections on said bar, upwardly-extending arms on said bar, said arms being of greater length than said teeth and said shoes, and a movable stop on said frame lying in the path of said arms to normally hold said rake against revolution.

2. In a stalk-rake, the combination with a frame, a truck adapted to support the forward end and downwardly-extending tailpieces rigidly secured on the rear end of said frame, of a rake comprising a main bar journaled in the free ends of said tailpieces, a plurality of rows of radial projections on said bar adapted to successively engage the earth to impart rotary motion to said bar, the projections of one row being longer than the projections of the other rows, a stop on said frame adapted to be moved into and out of the path of the row of longer projections to hold said bar against revolution and release the same, a lever on said frame, and connection between said lever and said stop to control the latter.

3. In a stalk-rake, the combination of a frame, a truck on which the frame is supported, downwardly and rearwardly extending tailpieces carried by the frame, a main bar journaled in the said tailpieces, a row of teeth projecting from said bar, a number of said teeth projecting through the bar and beyond the opposite side of the same, arms projecting from said bar, a movable stop carried by the frame and adapted to engage said arms, and shoes carried by the bar on the opposite side to said arms, said shoes being adapted to ride on the surface of the earth when said teeth are in operative position.

In testimony whereof I affix my signature in presence of two witnesses.

ASLER C. THOMPSON.

Witnesses:
R. E. BURGER,
H. W. MITCHELL.